United States Patent

Kump

[11] Patent Number: 5,876,575
[45] Date of Patent: Mar. 2, 1999

[54] METHOD AND APPARATUS FOR TREATMENT OF WATER

[76] Inventor: Joseph A. Kump, 9911 Larson St., Garden Grove, Calif. 92644

[21] Appl. No.: 523,433

[22] Filed: Sep. 5, 1995

[51] Int. Cl.⁶ .............................. C25B 9/00; C02F 1/46
[52] U.S. Cl. ..................... 204/197; 204/248; 204/271; 204/286; 205/745; 205/733; 205/740
[58] Field of Search ................. 138/DIG. 6; 205/742, 205/745, 730, 733, 740; 204/248, 197, 271, 286, 280, 288, 297 R

[56] References Cited

U.S. PATENT DOCUMENTS

| | | | |
|---|---|---|---|
| 528,318 | 10/1894 | Bailey | 204/248 |
| 752,844 | 2/1904 | Kinnear | 204/197 |
| 943,188 | 12/1909 | Hartman | 210/710 |
| 947,358 | 1/1910 | Stubbs | 204/288 |
| 2,609,340 | 9/1952 | McMahon et al. | 204/197 |
| 2,670,327 | 2/1954 | Rader | 204/248 |
| 3,342,712 | 9/1967 | O'Keefe, Sr. | 205/733 |
| 3,425,925 | 2/1969 | Fleischman | 204/197 |
| 4,325,798 | 4/1982 | Mack | 204/248 |
| 4,525,253 | 6/1985 | Hayes et al. | 204/271 |
| 4,822,472 | 4/1989 | Reis et al. | 204/665 |
| 5,094,739 | 3/1992 | Kump | 205/745 |
| 5,230,807 | 7/1993 | Koslowski, II | 204/663 |
| 5,352,347 | 10/1994 | Reichert | 204/665 |
| 5,395,492 | 3/1995 | Schoeberl | 210/748 |

*Primary Examiner*—Robert Warden
*Assistant Examiner*—Alex Noguerola
*Attorney, Agent, or Firm*—Robert E. Strauss

[57] ABSTRACT

There is disclosed a method, and the apparatus useful in the method, for the treatment of water in which the treatment unit is formed of a vessel having a treatment chamber with interior surfaces formed entirely of a nonferrous metal, preferably of copper and/or brass. Within the treatment chamber is suspended an electrode subassembly of copper cathodes and a sacrificial magnesium anode, formed of copper and magnesium plates which are oriented in substantially parallel array, spaced apart by a plurality of electrically conductive spacing elements.

9 Claims, 2 Drawing Sheets

METHOD AND APPARATUS FOR TREATMENT OF WATER

BACKGROUND OF THE INVENTION

1. Field of Invention

This invention relates to a method and apparatus for treatment of water and, in particular, to an improved method and apparatus for treatment of water with an electrolytic cell having a sacrificial magnesium anode.

1. Brief Statement of the Prior Art

The chemical treatment of water which contains calcium and magnesium carbonates and bicarbonates, commonly referred as hardness, is widely practiced to reduce scaling and corrosion of the water handling equipment. While it has been known for some time that water can be treated by passing the water over an electrolytic cell formed of a sacrificial magnesium anode and a copper cathode, the treatment has been met with limited success. U.S. Pat. No. 3,342,712, discloses an early attempt to develop an efficient method and apparatus for this treatment. In my prior U.S. Pat. No. 5,094,739, I have disclosed an improved method and apparatus for treatment of water with a magnesium and copper electrolytic cell having electrode assemblies of magnesium and copper plates separated by thin spacers, in an attempt to provide extended electrode surfaces which would resist polarization. In such apparatus, the electrolytic cell has been suspended or mounted within a mild or stainless steel treatment vessel.

The treatment of water with magnesium invariably has resulted in the formation of soft, flocculent precipitates of calcium. These precipitates are non-adhesive and typically have accumulated within the vessel housing the electrolytic cell, requiring frequent, usually monthly, cleaning and back-flushing with water to remove the precipitates. During the monthly servicing, the electrode assembly has also been replaced to clean polarizing coatings from the electrode surfaces.

As disclosed in my aforementioned patent, the electrolytic cell is formed of alternating magnesium and copper plates which are assembled by a fastener such as a brass bolt which is passed through aligned holes in the plates, using brass washers interspaced between the plates to maintain the plates in a spaced apart parallel array. During the monthly cleaning and repair of the electrolytic cells assembled in this fashion, many of the magnesium anodes required replacement because of abnormal enlargement of the holes in the plates. This prevented efficient utilization of the sacrificial magnesium anodes. Further, the magnesium consumption in these electrolytic cells was quite substantial; a typical single household installation consuming about one pound of magnesium per month.

OBJECTIVES OF THE INVENTION

It is an objective of this invention to provide an improved method and apparatus for treatment of water with a treatment unit having an electrolytic cell with a sacrificial magnesium anode in which the consumption of the magnesium anode is significantly reduced from that of previous units.

It is an additional objective of this invention to provide a method and apparatus for treatment of water with a treatment unit having a sacrificial magnesium anode which has greatly reduced maintenance requirements from prior units.

It is a further objective of this invention to provide a method and apparatus for the electrolytic treatment of water with a treatment unit having a sacrificial magnesium anode which significantly reduces, or eliminates entirely, the formation of precipitates in the treatment vessel.

It is an additional objective of this invention to provide a treatment unit for electrolytic treatment of water that efficiently uses the sacrificial magnesium anode.

Other and related objectives will be apparent from the following description of the invention.

BRIEF DESCRIPTION OF THE INVENTION

The invention comprises a method, and the apparatus used in the method, for the treatment of water in which the treatment unit is formed of a vessel having a treatment chamber with interior surfaces formed entirely of a nonferrous metal. Within the treatment chamber is suspended an electrode subassembly of copper and magnesium plates which are oriented in substantially parallel array, spaced apart by a plurality of electrically conductive spacing elements.

BRIEF DESCRIPTION OF THE DRAWINGS

The invention will be described with reference to the Figures of which.

DESCRIPTION OF PREFERRED EMBODIMENTS

Figure 1:
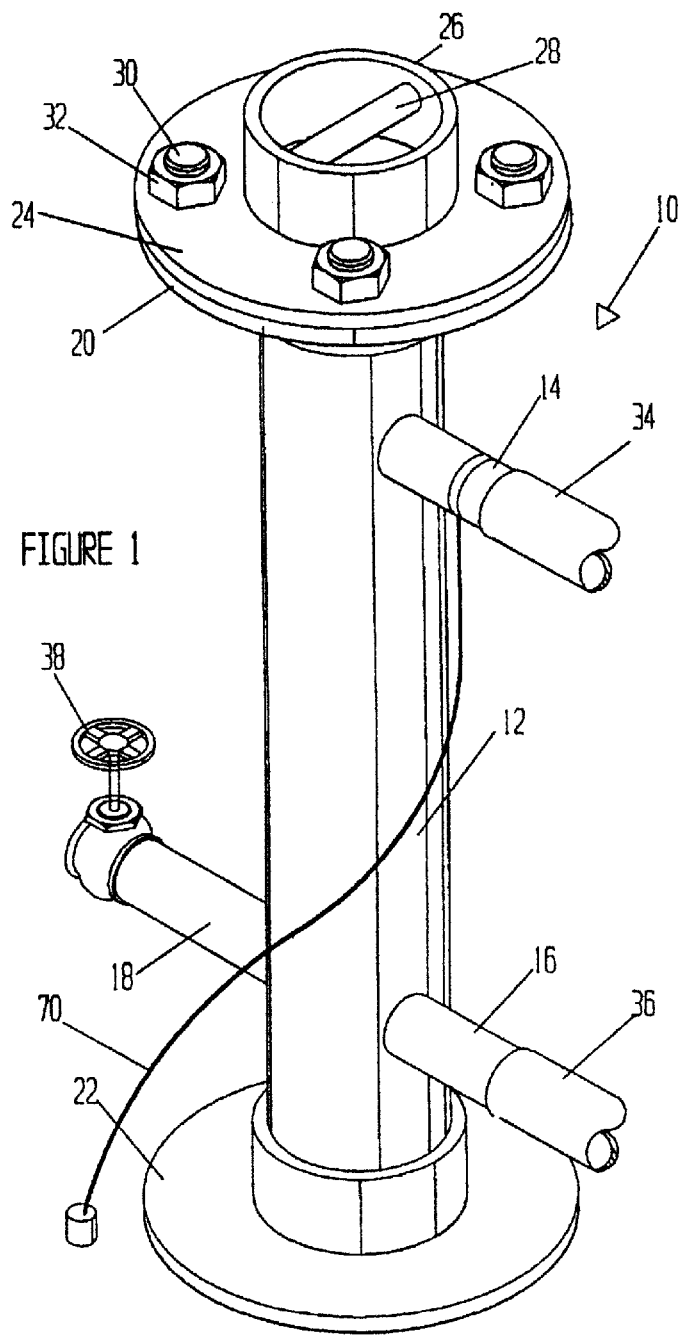
FIG. 1 is a perspective view of the electrolytic treatment vessel of the invention.

Referring to FIG. 1, the electrolytic cell of the invention will be described. As there illustrated, the electrolytic cell 10 is housed in a vessel 12 that provides a treatment chamber having an inlet nozzle 14 adjacent its upper end, and an outlet nozzle 16 and drain nozzle 18 which are located adjacent the lower portion of the vessel 12. The treatment vessel as illustrated is intended for vertical installation and is formed of a cylindrical copper tube which has conventional end flanges 20 and 22 formed of a nonferrous metal, preferably brass. The lower end flange 22 is closed, thus forming a blind flange while the flange 20 on the upper end of the copper tube is open and receives a cover flange 24 of the same construction, i.e., a brass pipe flange. The cover flange 24 is provided with an end closure plate, not shown, which is brazed within the neck 26 of the flange thereby forming a blind flange. A metal bar 28 is secured inside the neck 26, traversing the interior recess of the flange neck 26 to provide a convenient grip for lifting and handling the electrolytic cell subassembly described hereinafter.

The upper cover flange 24 is removably secured in the assembly and, for this purpose, a plurality of machine fasteners, i.e., conventional bolts 30, extend upwardly from the open end flange 20 and receive conventional nut fasteners 32 whereby the upper blind flange 24 can be removed from the assembly. The upper inlet nozzle 14 is attached to conventional water delivery conduit 34 formed of copper, galvanized steel or plastic pipe, and the lower outlet nozzle is similarly attached to a water delivery conduit 36. A conventional brass valve 38 is mounted on the drain nozzle 18 of the vessel 12. Preferably, the unit is electrically isolated from the water delivery system by an electrical grounding wire 70 which extends from the inlet nozzle 14 to an electrical ground, e.g., a stake embedded in the ground.

Figure 2:
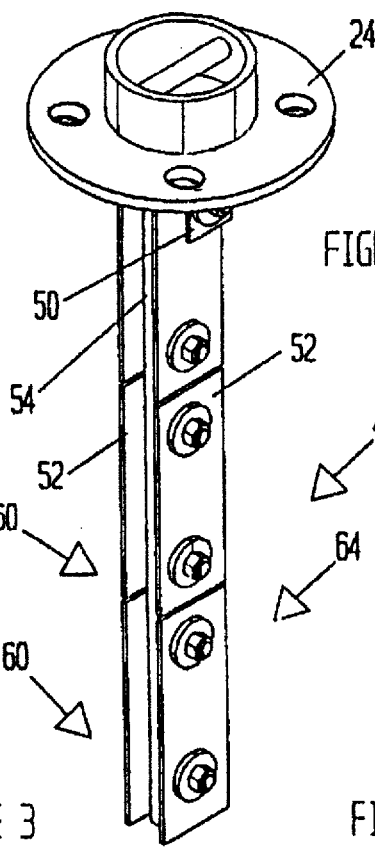
FIG. 2 is a perspective view of the electrolytic cell subassembly used in the vessel shown in FIG. 1.

Referring now to FIG. 2, the electrolytic cell subassembly 40 is shown in perspective view. This subassembly 40 is shown withdrawn from the treatment vessel 12 and includes the upper cover flange 24. Attached by a bracket 50 to the undersurface of the cover flange 24 is an electrode assembly of copper cathodes 52 and a magnesium anode 54. The sacrificial magnesium anode 54 is an elongated plate centrally located in the assembly, spaced between a plurality of pairs of thin copper plates 52. The plates 52 and 54 are maintained in assembly by a plurality of conventional machine bolts 56 and nut fasteners 58 which are provided for each set 60 of pairs of copper plates 52 adjacent the opposite ends of each pair of copper plates 52. Each machine bolt 56 extends through aligned apertures in the copper plates 52 and magnesium plates 54 and is secured by a conventional nut fastener 58.

Figure 3:
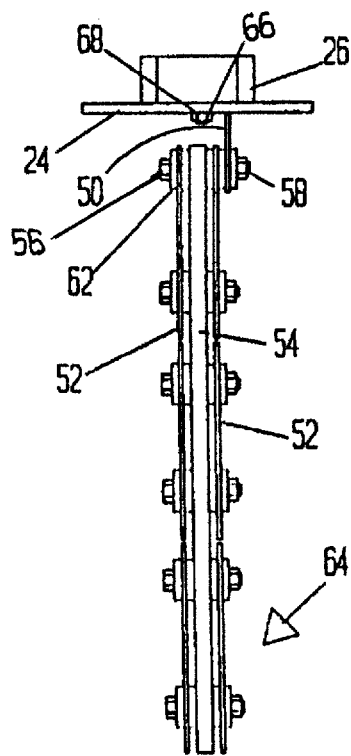
FIG. 3 is an elevational side view of the electrolytic cell subassembly shown in FIG. 2.
Figure 4:
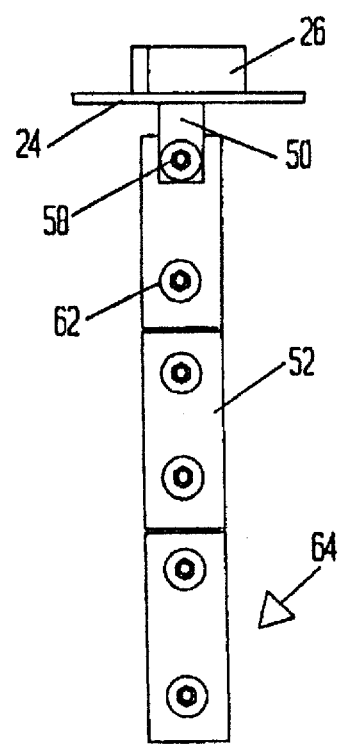
FIG. 4 is an elevational front view of the electrolytic cell subassembly shown in FIG. 3.

As shown in FIG. 3, the alternating copper plates 52 and magnesium plates 54 are secured in a spaced apart, parallel array by spacers which are conventional washers 62. The bolts 56, nuts 58 and washers 62 are formed of brass and provide electrical continuity between the copper cathodes and magnesium anodes of the electrolytic cell.

At its upper end, the assembly 64 of copper plates 52 and magnesium plate 54 is suspended from the upper cover plate 24 by a bracket 50 which is fastened to the undersurface of the cover plate by a conventional brass bolt 66 that extends through the blind cover plate 24 and receives a nut 68 to secure the bracket 50.

In a typical household unit, the treatment vessel is formed of a three inch internal diameter copper tube and the electrolytic cell comprises a single magnesium plate 2 inches wide, 0.5 inch thick and about 18 inches in length; about three pounds of magnesium. The copper cathodes are formed of copper plates approximately 0.1 inch thick and 2.5 inches wide and about 6 inches long. The electrode assembly 64 is secured with conventional ⅜ inch diameter brass bolts and nuts. The inlet nozzle 14, outlet nozzle 16 and drain nozzle 18 of the vessel are formed of 1 inch internal diameter copper tubing.

Treatment vessels of the general configuration shown in FIGS. 1 and 2 of this application were used in many household applications. The treatment vessels previously used were formed of ferrous metals including stainless steel and galvanized steel pipe. Over a period of several years of use, it was observed that the typical household unit required monthly maintenance for removal of precipitates which formed and accumulated within the treatment vessel. It was also observed that the consumption of the magnesium anode averaged approximately 0.5 pounds per month in a typical single household application. It was also observed that the entire unit required replacement after two years because of corrosion and degradation of the treatment vessel. In these installations, the assemblies of electrodes were also removed and replaced monthly, and the removed assemblies were reconditioned by chemical washing to remove polarizing coatings and to replace the magnesium anodes as required. It was observed that the magnesium anodes could not be used completely because the assembly holes which received the bolts frequently became enlarged by abnormal dissolution rate of the magnesium surrounding the bolt holes.

When the units of the invention which were formed of the copper pipe with brass fittings and enclosures were substituted for the aforementioned treatment vessels a dramatic change in performance was observed. The units were observed to be free of floc and precipitates and monthly cleaning of the interior chamber of the treatment vessel became unnecessary. Additionally, it was observed that the consumption of magnesium was reduced by an average of 75%, reducing the magnesium consumption for a typical single household unit from 0.5 pound to between 0.1 and 0.2 pound per month. It was also observed that the abnormal enlargement of the bolt holes of the magnesium anodes did not occur and that it was possible to obtain substantially complete utilization of the magnesium as the sacrificial anode as the magnesium plate dissolved uniformly across its surface.

The treatment unit and method of this invention are applicable for the treatment of water in household applications, and units of larger proportions are useful in industrial and agricultural applications. In household applications the treatment avoids the necessity for conventional water softeners and, since no sludge or precipitates are formed by the treatment, there is a significant reduction in demands placed on domestic sewage treatment plants.

In industrial applications such as the treatment of boiler feed water, the method likewise avoids formation of precipitates and a significant reduction in waste discharge. In other industrial applications such for recovery and treatment of plating solutions used in manufacturing of printed circuit boards, the treatment unit greatly reduces the quantities of chemicals and reduces, or eliminates entirely, the sludge formed during treatment of plating solutions, resulting in clarified water which can be recycled within the plating plant rather than being discharged to the waste water system.

The treatment equipment described in this invention can be in agricultural applications such as orchards where it will greatly reduce the requirements for irrigation water, up by about 50 percent, and reduce the requirements for fertilizers about 25 percent. The treatment equipment can be used for municipal applications such as golf courses and parks where it can reduce the requirements for irrigation water approximately 75 percent.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A water treatment unit which comprises:
   a. a vessel having a treatment chamber with an inlet nozzle and an outlet nozzle with interior surfaces of said vessel and nozzles consisting entirely of a non-ferrous metal selected from the group consisting of copper and brass;
   b. an electrode sub-assembly of copper cathode and magnesium anode plates secured in said sub-assembly by at least one fastener extending through aligned apertures in said anode and cathode plates, said plates being oriented in substantially parallel, closely-spaced-apart alternating array by a plurality of electrically conductive spacing elements providing electrical conductivity between said anode and cathode plates; and
   c. a hanger attached to said vessel and to said sub-assembly to suspend said sub-assembly within said vessel.

2. The water treatment unit of claim 1 wherein said non-ferrous metal is copper.

3. The water treatment unit of claim 1 wherein said vessel is a cylindrical copper tube.

4. The water treatment unit of claim 3 wherein said vessel includes a blind flange which is removably attached to the upper end of said vessel and wherein said hanger is attached to the underside of said blind flange.

5. The water treatment unit of claim 4 including a second blind flange which is attached to the lower end of said vessel.

6. The water treatment unit of claim 4 wherein said hanger is a bracket having its upper end attached to the underside of said blind flange and its lower end attached to the upper end of said electrode sub-assembly.

7. The water treatment unit of claim 6 wherein said sub-assembly comprises at least one magnesium plate spaced between a pair of copper plates which are retained in a parallel, spaced apart array with a plurality of brass spacers and which extend from said bracket substantially the length of said treatment vessel.

8. The water treatment unit of claim 4 wherein said end flanges are brass.

9. The water treatment unit of claim 4 including a handle permanently attached to the upper surface of said blind flange.

* * * * *